US007940775B2

(12) United States Patent
Guo et al.

(10) Patent No.: US 7,940,775 B2
(45) Date of Patent: May 10, 2011

(54) PRIORITY-BASED DATA MESSAGE PUBLISHING METHOD AND SYSTEM ACCORDING TO A DATA MESSAGE CHAIN

(75) Inventors: Jacob Guo, Dajia Township, Taichung County (TW); Chih-Hao Hsu, Taipei (TW); Chin-Cheng Wu, Gueishan Township, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 289 days.

(21) Appl. No.: 11/964,985

(22) Filed: Dec. 27, 2007

(65) Prior Publication Data

US 2009/0147780 A1 Jun. 11, 2009

(30) Foreign Application Priority Data

Dec. 11, 2007 (TW) .............................. 96147262 A

(51) Int. Cl.
*H04L 12/28* (2006.01)

(52) U.S. Cl. ................................................ 370/395.21

(58) Field of Classification Search ........................ None
See application file for complete search history.

(56) References Cited

U.S. PATENT DOCUMENTS

| | | | | |
|---|---|---|---|---|
| 5,440,541 | A * | 8/1995 | Iida et al. | 370/352 |
| 5,594,722 | A * | 1/1997 | Iida et al. | 370/426 |
| 7,039,914 | B2 * | 5/2006 | Potter, Jr. | 718/102 |
| 7,324,540 | B2 * | 1/2008 | Vangal et al. | 370/419 |
| 2003/0108034 | A1 * | 6/2003 | Yu | 370/352 |
| 2004/0042497 | A1 * | 3/2004 | Vangal et al. | 370/503 |
| 2005/0025152 | A1 * | 2/2005 | Georgiou et al. | 370/394 |
| 2007/0276933 | A1 * | 11/2007 | Lee et al. | 709/223 |

* cited by examiner

*Primary Examiner* — Chi H Pham
*Assistant Examiner* — Fan Ng
(74) *Attorney, Agent, or Firm* — Thomas, Kayden, Horstemeyer & Risley, LLP

(57) ABSTRACT

A priority-based data message publishing method according to a data message chain can be implemented by receiving a data message, wherein the data message has an original priority. Then, judge whether there is a corresponding data message chain corresponding to the data message. When there is a corresponding data message chain, add the data message to the back of the corresponding data message chain to obtain a revised data message chain. When there is no corresponding data message chain the data message, add a new data message chain, and add the data message to the back of the new data message chain to obtain a revised data message chain. Next, rule-operate the revised data message chain to obtain a dynamic priority of the data message. Replace the original priority with the dynamic priority to obtain a revised data message. Publish the revised data message according to the dynamic priority.

25 Claims, 8 Drawing Sheets

PRIORITY-BASED DATA MESSAGE PUBLISHING METHOD AND SYSTEM ACCORDING TO A DATA MESSAGE CHAIN

RELATED APPLICATIONS

This application claims priority to Taiwan Application Serial Number 96147262, filed Dec. 11, 2007, which is herein incorporated by reference.

BACKGROUND

1. Field of Invention

The present invention relates to a computer system. More particularly, the present invention relates to a publishing/subscription system to dynamically change publishing priorities of data messages according to data message chains.

2. Description of Related Art

Publishing/subscription systems, which transmit data messages from publishing computers to subscribing computers through the Internet, have become very popular. In detail, publishing/subscription systems are asynchronous messaging systems where publishing computers are not programmed to send their data messages to specific subscribing computers. Rather, published data messages are characterized into classes and transmitted to a data message broker, without knowledge of what (if any) subscribing computers there may be. The data message broker publishes the published data messages to the subscribing computers that subscribe the characterized classes.

Data message transmissions of publishing/subscription systems are mainly implemented by first-in-first-out (FIFO). FIG. 1 is a block diagram showing a conventional publishing/subscription system implemented by FIFO. Refer to FIG. 1. The system comprises a publishing application 102, a data message broker 104, and a subscribing application 106. The publishing application 102 and the subscribing application 106 refer to software programs running on computers. The data message broker 104 is implemented by FIFO. Therefore, the data message broker 104 publishes data messages according to time sequence. For example, the publishing application 102 publishes data messages m1, m2, and m3 sequentially to the data message broker 104. Then, according to the time sequence, the message broker 104 publishes the data messages m1, m2, and m3 sequentially to the subscribing application 106. However, when the data message m2 is urgent, the data message m2 is still published after the data message m1. As the increasing number of data messages, FIFO may delay some urgent data messages.

To improve FIFO, Dynamic Priority Scheduling is disclosed. FIG. 2 is a block diagram showing a conventional publishing/subscription system implemented by Dynamic Priority Scheduling. Refer to FIG. 2. The system comprises a publishing application 102, a data message broker 204, and a subscribing application 106. The publishing application 102 and the subscribing application 106 refer to software programs running on computers. The data message broker 204 is implemented by Dynamic Priority Scheduling. Therefore, the data message broker 204 publishes data messages according to priorities. For example, the publishing application 102 publishes data messages n1, n2, and n3, wherein the data message n2 is urgent. Since the data message n2 is urgent, the data message broker 204 sets priority of the data message n2 as $P_{n2}=3$, wherein priority=3 means high priority. Since the data messages n1 and n3 are general data messages, the data message broker 204 respectively sets priorities of the data messages n1 and n3 as $P_{n1}=1$ and $P_{n3}=1$, wherein priority=1 means low priority. Therefore, according to the priority, the data message broker 204 may publish the data messages n2, n1, and n3 sequentially. However, relations between data messages are ignored. For example, the data message n3 is related to the urgent data message n2, but $P_{n3}$ is just set to 1, which means that the data message n3 can't be published in time to support the urgent data message n2.

Therefore, what is needed is a method and a system to publish a data message according to the priority of the data message. Wherein the priority is set according to contents of both the data message and related data messages of the data message. Hence, subscribers can receive urgent data messages and those data messages related to the urgent data messages. In addition, as increasing number of data messages, the subscribers can deal with data messages properly according to priority value.

SUMMARY

According to one embodiment of the present invention, a priority-based data message publishing method according to a data message chain is provided. The method comprises the steps of receiving a data message, wherein the data message has an original priority. Then, judge whether there is a corresponding data message chain corresponding to the data message. When there is a corresponding data message chain, add the data message to the back of the corresponding data message chain to obtain a revised data message chain. When there is no corresponding data message chain the data message, add a new data message chain, and add the data message to the back of the new data message chain to obtain a revised data message chain. Next, rule-operate the revised data message chain to obtain a dynamic priority of the data message. Replace the original priority with the dynamic priority to obtain a revised data message. Publish the revised data message according to the dynamic priority.

According to another embodiment of the present invention, a priority-based data message publishing system according to a data message chain is provided. The system comprises a publishing application, a data message broker, and a subscribing application. The publishing application publishes a data message, wherein the data message comprises an original priority. The data message broker has a connection with the publishing application to execute the steps of receiving the data message, searching for a corresponding data message chain corresponding to the data message, adding the data message to the back of the corresponding data message chain to obtain a revised data message chain, rule-operating the revised data message chain to obtain a dynamic priority of the data message, replacing the original priority with the dynamic priority to obtain a revised data message, and publishing the revised data message according to the dynamic priority. The subscribing application has a connection with the data message broker to receive the revised data message.

According to another embodiment of the present invention, a non-transitory storage medium is provided to store several instructions to execute a data message publishing method. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives. The data message publishing method comprises the steps of receiving a data message, wherein the data message has an original priority. Then, judging whether there is a corresponding data message chain corresponding to the data message. When there is a corresponding data message chain, adding the data message to the back of the corresponding data message chain to obtain a revised data message chain. When there is no corresponding data message chain, adding a new data message chain, and adding the data message to the back of the new data message chain to obtain a revised data message chain. Next, rule-operating the revised data message chain to obtain a dynamic priority of the data message. Replacing the original priority with the dynamic priority to obtain a revised data message and publishing the revised data message according to the dynamic priority.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
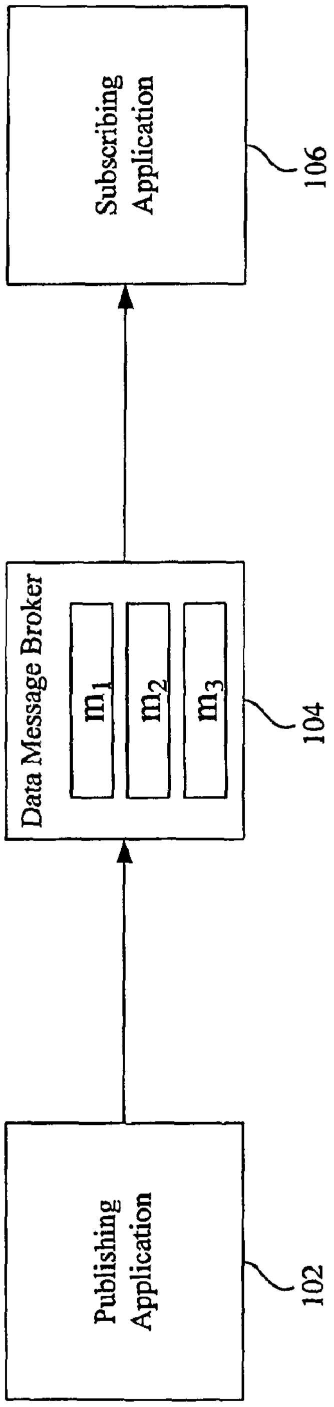
FIG. 1 is a block diagram showing a conventional publishing/subscription system implemented by FIFO.

Reference will now be made in detail to the present embodiments of the invention, examples of which are illustrated in the accompanying drawings. Wherever possible, the same reference numbers are used in the drawings and the description to refer to the same or like parts.

Figure 3:
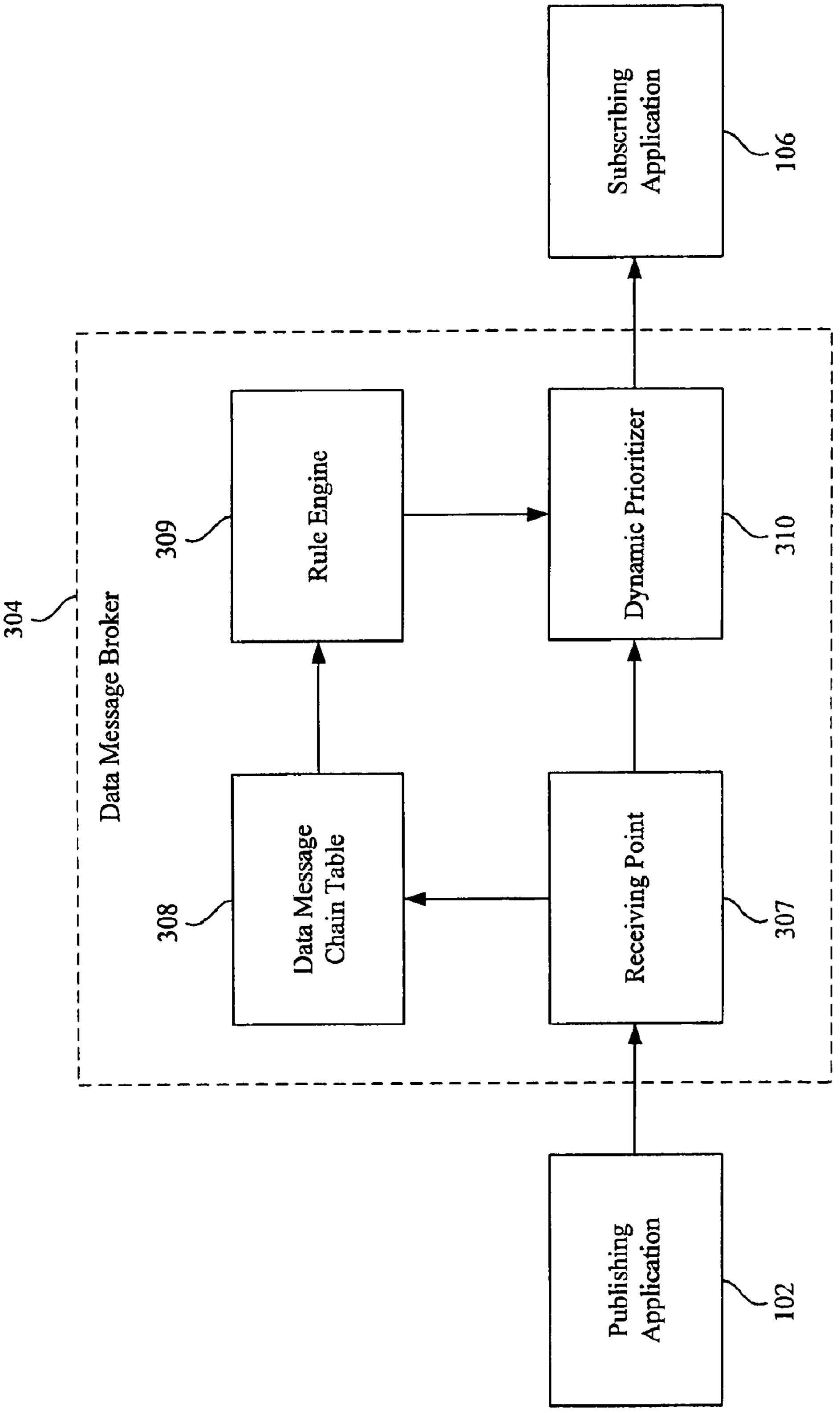
FIG. 3 is a priority-based data message publishing system according to a data message chain according to one embodiment of this invention.

FIG. 3 is a priority-based data message publishing system according to a data message chain according to one embodiment of this invention. Refer to FIG. 3. The system comprises a publishing application 102, a data message broker 304, and a subscribing application 106. Wherein the data message broker 304 comprises a receiving point 307, a data message chain table 308, a rule engine 309, and a dynamic prioritizer 310. The publishing application 102 and the subscribing application 106 refer to software programs running on computers. The data message broker 304 is implemented according to one embodiment of this invention. The data message chain table 308 stores a plurality of data message chains. Each data message chain stores a plurality of data messages. Each data message has a data message identification number and a corresponding data message identification number.

In operation, the publishing application 102 publishes a data message to the data message broker 304. Wherein the data message contains an original priority. The receiving point 307 of the data message broker 304 may transmit the data message to the data message chain table 308 and the dynamic prioritizer 310. The data message chain table 308 searches for a corresponding data message chain of the data message. In detail, the corresponding data message chain of the data message means that the data message identification number of the last data message of the corresponding data message chain is the same as the corresponding data message identification number of the data message. When there is a corresponding data message chain, add the data message to the back of the corresponding data message chain to obtain a revised data message chain. When there is no corresponding data message, add a new data message chain, and add the data message to the back of the new data message chain to obtain a revised data message chain. The rule engine 309 receives all data messages of the revised data message chain to do rule-operations. Wherein rule-operations compare all topics of data messages of the revised data message chain with the rule database to determine the situation of the data message, and obtain a dynamic priority of the data message according to the situation of the data message. The dynamic prioritizer 310 receives the data message from the receiving point 307 and the dynamic priority from the rule engine 309. Next, the dynamic prioritizer 310 replaces the original priority with the dynamic priority to obtain the revised data message. Then, the dynamic prioritizer 310 publishes the revised data message according to the dynamic priority to the subscribing application 106.

Figure 2:
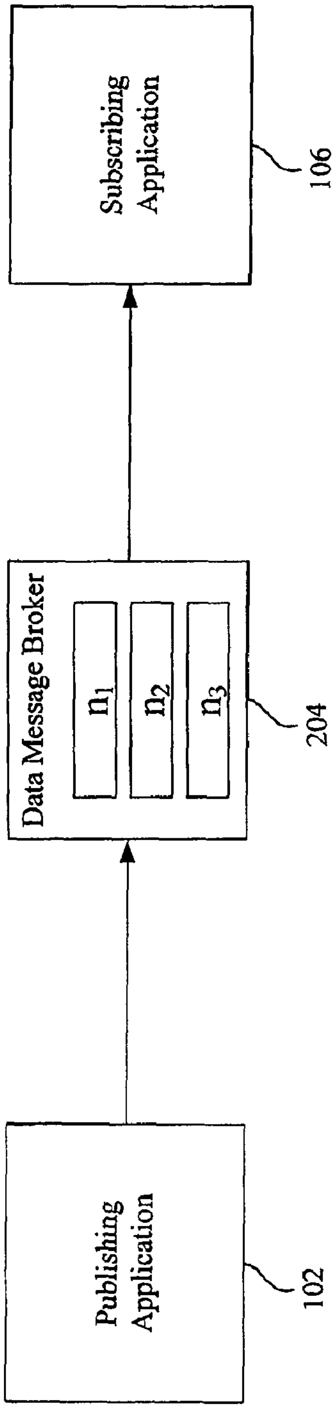
FIG. 2 is a block diagram showing a conventional publishing/subscription system implemented by Dynamic Priority Scheduling.
Figure 4A:
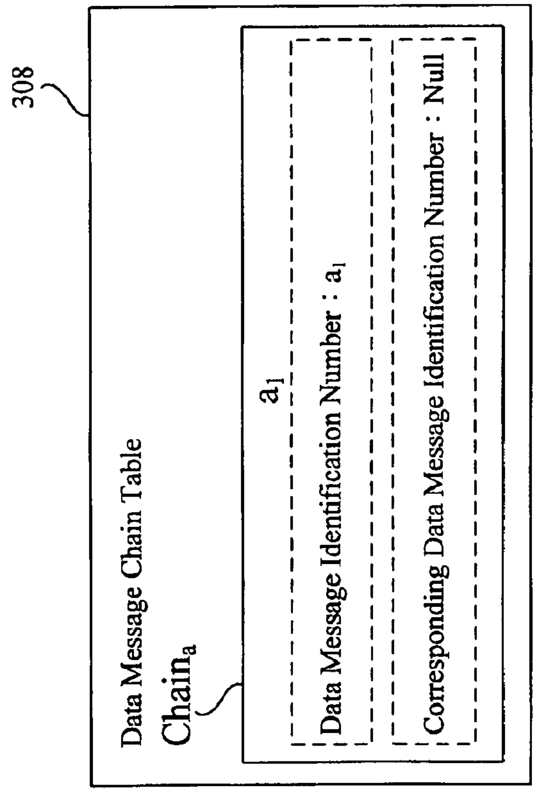
FIG. 4A and FIG. 4B are block diagrams of data message chain tables according to one embodiment of this invention.
Figure 4B:
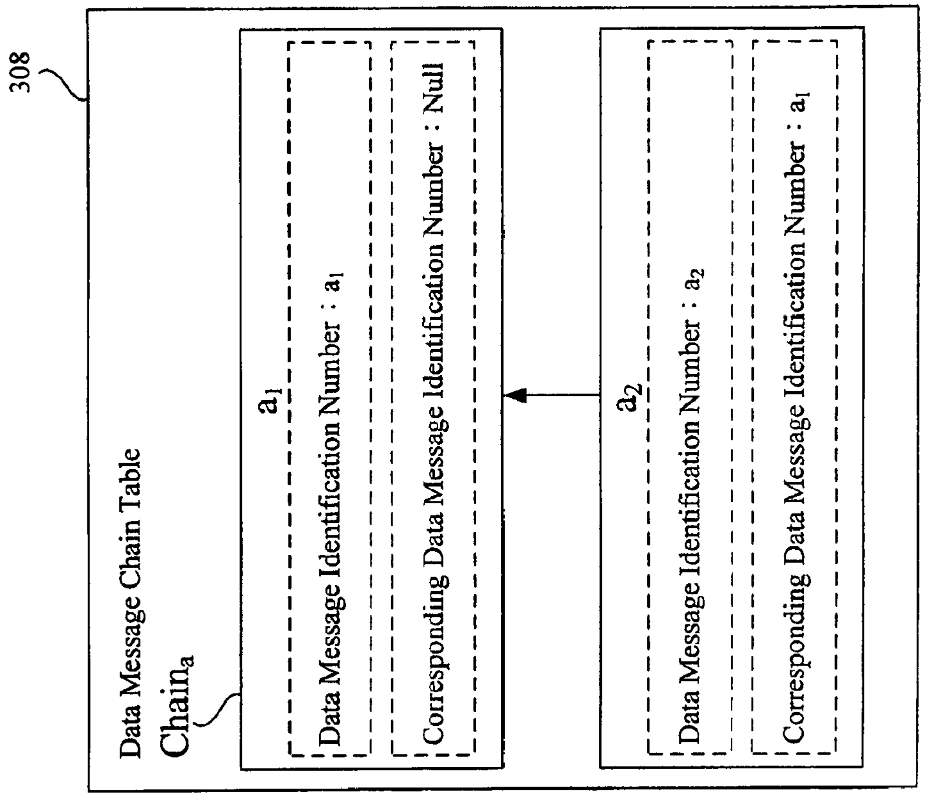

FIG. 4A and FIG. 4B are block diagrams of data message chain tables according to one embodiment of this invention. Refer to FIG. 4A. The data message chain table 308 stores a data message chain $Chain_a$. Wherein the data message chain $Chain_a$ has a data message a1. The data message identification number of the data message a1 is a1, and the corresponding data message identification number of the data message a1 is null. Then, a data message a2 is received. Wherein the data message identification number of the data message a2 is a2, and the corresponding data message identification number of the data message a2 is a2. Since the corresponding data message identification number of the data message a2 is the same as the data message identification number of the data message a1, the data message chain $Chain_a$ corresponds to the data message a2. Refer to FIG. 2. Add the data message a2 to the back of the data message chain $Chain_a$. Namely, add the data message a2 behind the data message a1.

Figure 5A:
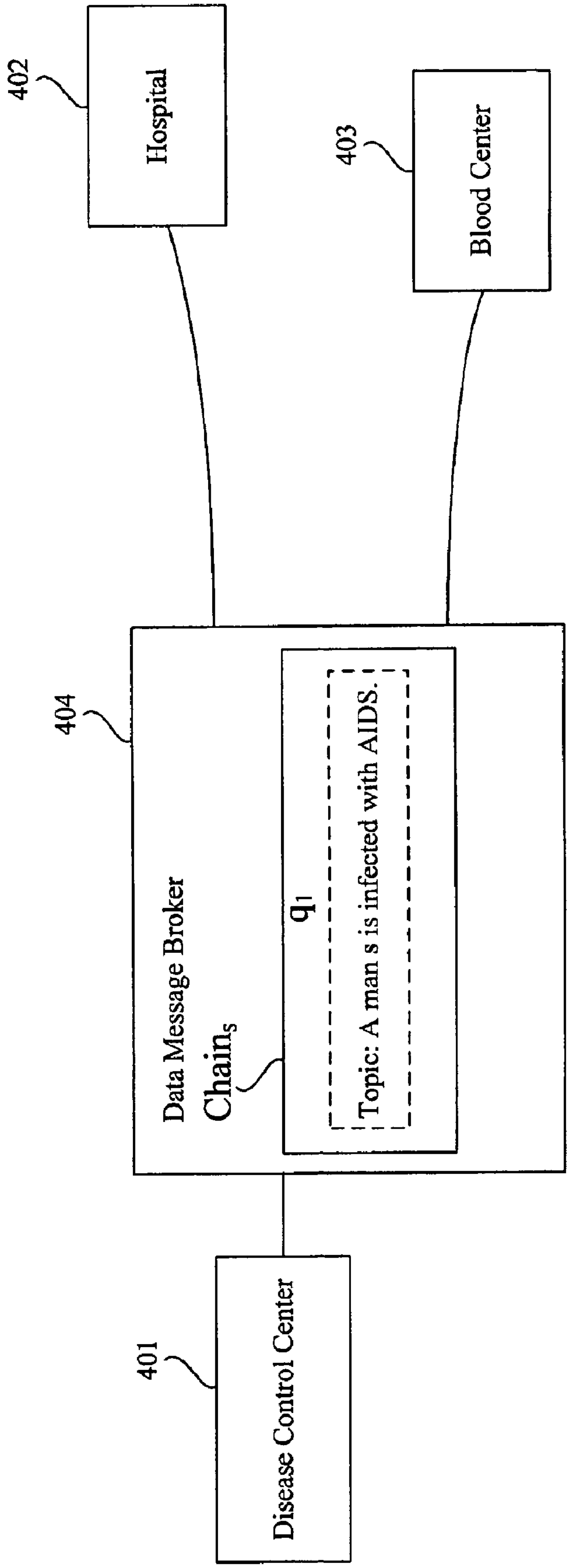
FIG. 5A and FIG. 5B are block diagrams of a priority-based data message publishing system used in a reporting system of blood according to a data message chain according to one embodiment of this invention.
Figure 5B:
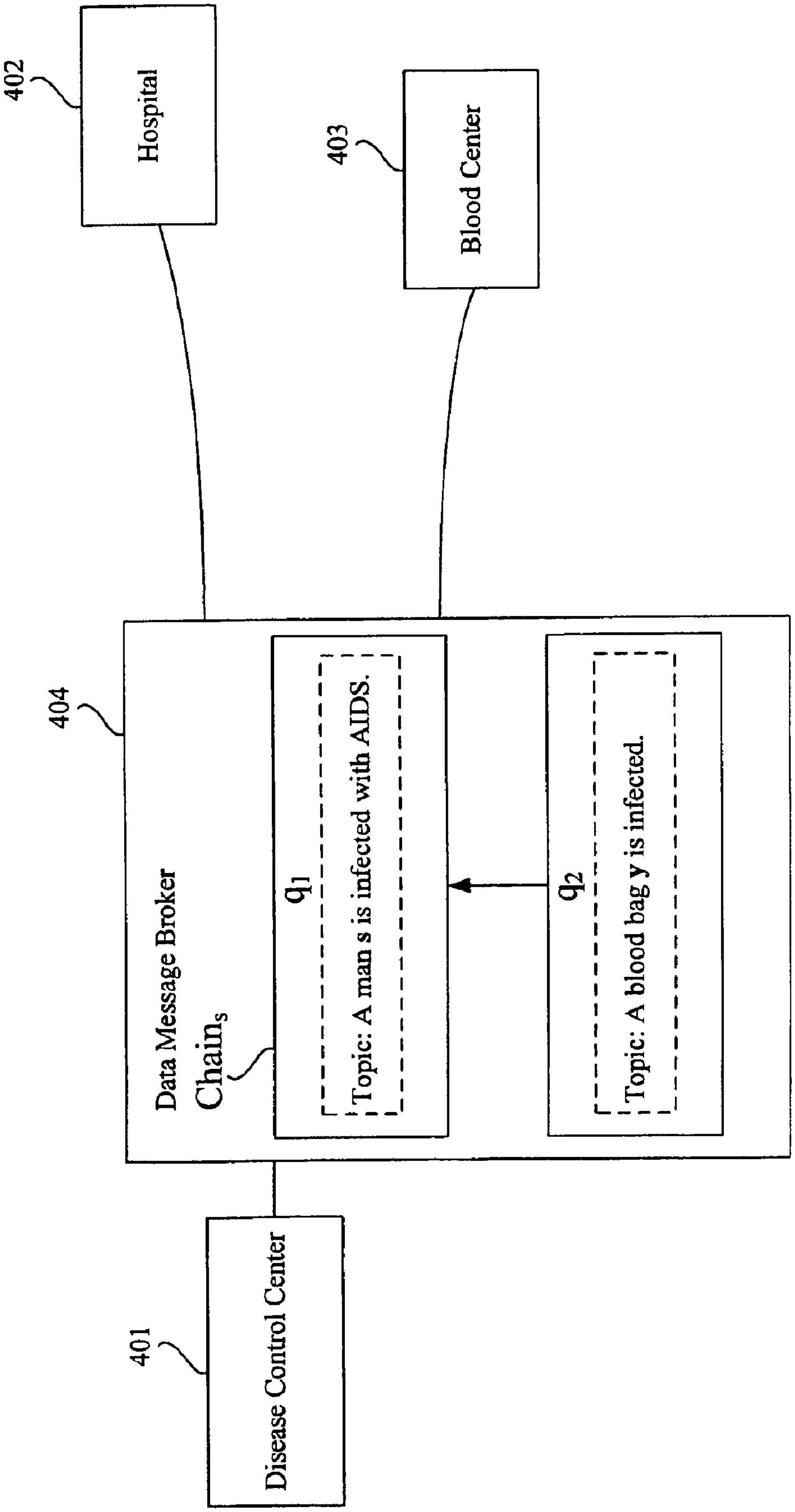

FIG. 5A and FIG. 5B are block diagrams of a priority-based data message publishing system used in a reporting system of blood according to a data message chain according to one embodiment of this invention. Refer to FIG. 5A. The reporting system of blood comprises a disease control center 401, a hospital 402, a blood center 403, and a data message broker 404. Wherein the disease control center 401, the hospital 402, and the blood center 403 comprise both publishing applications and subscribing applications. For example, the disease control center 401 publishes a data message q1 to the data message broker 404, wherein the topic of the data message q1 is that a man s is infected with AIDS. Since there is no previous data message chain corresponding to the data message q1 in the data message broker 404, the data message broker 404 adds a new data message chain $Chain_s$ and adds the data message q1 to the back of the data message chain $Chain_s$. Then, the data message broker 404 rule-operates the data message chain $Chain_s$. The data message chain $Chain_s$ only has one data message q1, whose topic is that a man s is infected with AIDS. According to the topic of the data message q1, the rule-operation sets the priority $p_{q1}$ of the data message q1 with a high priority value. For example, the data message broker 404 sets $p_{q1}$=3. Next, refer to FIG. 5B. The blood center 403 receives the data message q1, and deals with the data message q1 right away for its high priority value. Soon, the blood center 403 finds out that the man s donated his blood lately, wherein the donated blood of the man s is packed in a blood bag y. Then, the blood center 403 publishes a data message q2, whose topic is that a blood bag y is infected. Since the data message q2 corresponds to the data message q1, the corresponding data message identification is set to q1. The data message broker 404 receives the data message q2. Since the corresponding data message identification of the data message q2 is the same as the data message identification number of the data message q1, the data message broker 404 selects the data message chain $Chain_s$ as the corresponding data message chain of the data message q2. Then, the data message broker 404 adds the data message q2 to the back of the data message chain $Chain_s$. Next, the data message broker 404 rule-operates all data messages of the corresponding data message chain $Chain_s$. In detail, one topic in the corresponding data message chain $Chain_s$ is that a blood bag y is infected, and the other topic in the corresponding data message chain $Chain_s$ is that a man s is infected with AIDS. Combining these two topics in the corresponding data message chain $Chain_s$, the data message q2 may need a high priority value. For example, the priority $p_{q2}$ of the data message q2 is set to 3. Then, the data message q2 may be published by the data message broker 404 as soon as possible. The hospital 402 receives the data message q2 which has the high priority $p_{q2}$. The hospital 402 may deal with the data message q2 for its high priority.

Figure 6A:
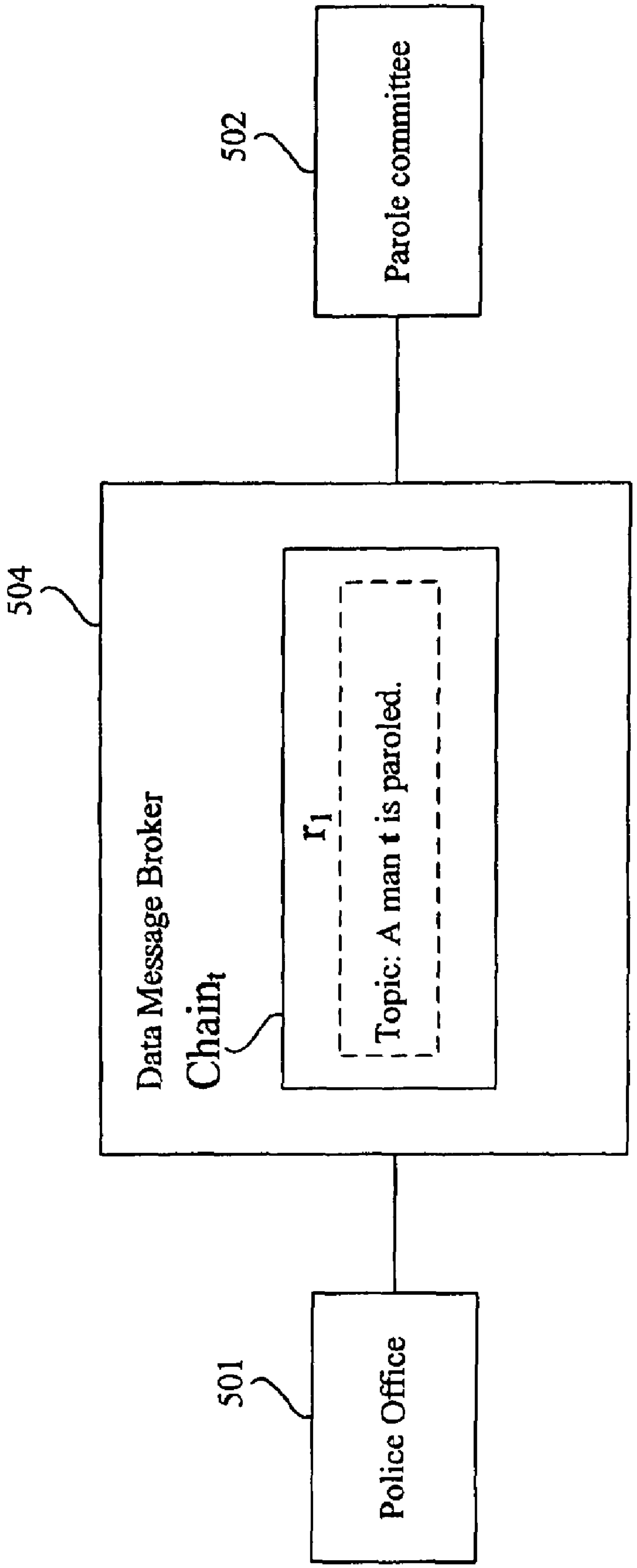
FIG. 6A and FIG. 6B are block diagrams of a priority-based data message publishing system used in a reporting system of crime according to a data message chain according to one embodiment of this invention.
Figure 6B:
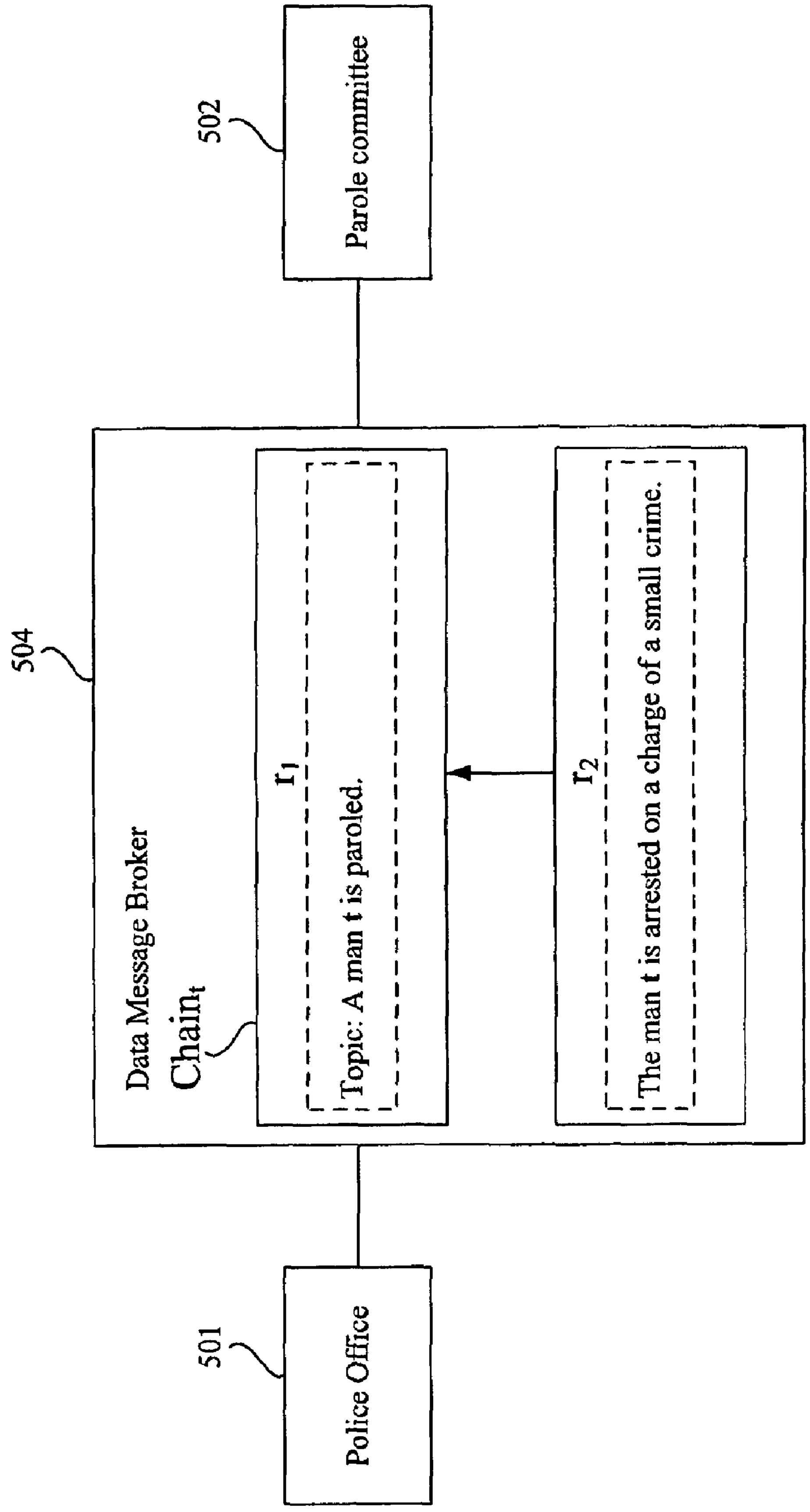

FIG. 6A and FIG. 6B are block diagrams of a priority-based data message publishing system used in a reporting system of crime according to a data message chain according to one embodiment of this invention. Refer to FIG. 6A. The reporting system of crime comprises a police office 501, a parole committee 502, and a data message broker 505. Wherein the police office 501 and the parole committee 502 comprise both publishing applications and subscribing applications. For example, the parole committee 502 publishes a data message r1, whose topic is that a man t is paroled. Since there is no previous data message chain corresponding to the data message r1 in the data message broker 504, the data message broker 504 adds a new data message chain $Chain_t$ and adds the data message r1 to the back of the data message chain $Chain_t$. Wherein the data message chain identification number is t. Then, the data message broker 504 rule-operates the data message chain $Chain_s$. The data message chain $Chain_t$ only has one data message r1, whose topic is that a man t is paroled. Since the data message r1 is routine, the priority $p_{r1}$ is set to a low priority value. For example, the data message broker 504 sets $p_{r1}$=1. Next, refer to FIG. 6B. During the parole period, the man t is arrested on a charge of a small crime. The police office 501 publishes a data message r2, whose topic is that the man t is arrested on a charge of a small crime. Wherein the corresponding data message chain identification number of the data message r2 is t. The data message broker 504 receives the data message r2. Since the corresponding data message chain identification number of the data message r2 is the same as the data message chain identification number of the data message chain $Chain_t$, the data message broker 504 selects the data message chain $Chain_t$ as the corresponding data message chain of the data message r2. Then, the data message broker 504 adds the data message r2 to the back of the data message chain $Chain_t$ and rule-operates the data message chain $Chain_t$. In detail, one topic in the corresponding data message chain $Chain_t$ is that the man t is arrested on a charge of a small crime, and the other topic in the corresponding data message chain $Chain_t$ is that a man t is paroled. Combining these two topics in the corresponding data message chain $Chain_t$, the data message r2 may need a high priority value. Then, the priority $p_{r2}$ of the data message r2 is set to, for example, 3. Therefore, the data message r2 may be published by the data message broker 404 as soon as possible. Once the parole committee 502 receives the data message r2, the parole committee 502 may go to the police office 501 to arrest the man t immediately for the man t's violation of the parole law.

Figure 7:
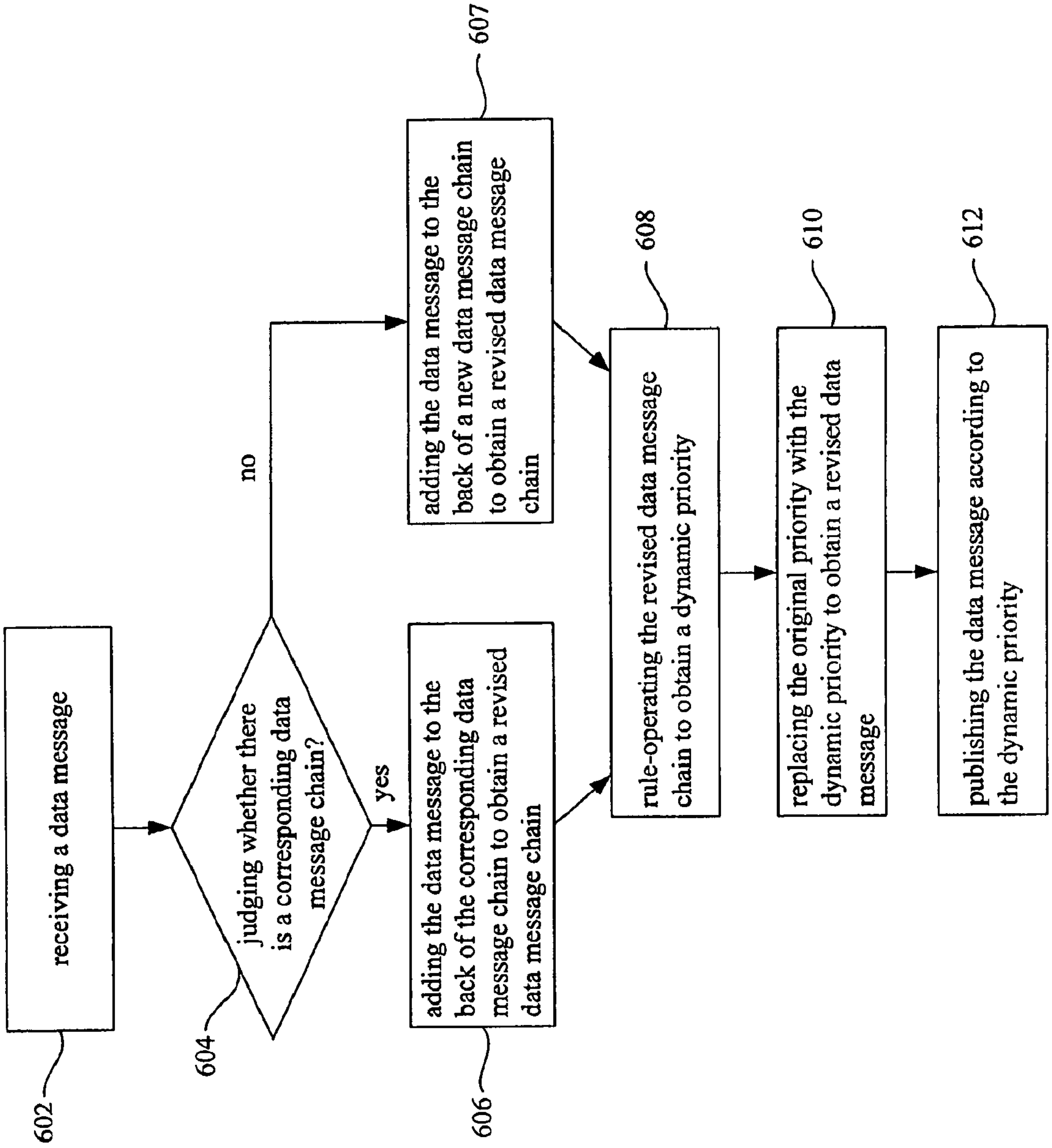
FIG. 7 is a flow diagram of a priority-based data message publishing method according to a data message chain according to one embodiment of this invention.

FIG. 7 is a flow diagram of a priority-based data message publishing method according to a data message chain according to one embodiment of this invention. The method begins with the step 602 in which a data message has an original priority. In the next step 604, the system judges whether there is a corresponding data message chain corresponding to the data message. In detail, the corresponding data message chain of the data message means that the data message identification number of the last data message of the corresponding data message chain is the same as the data message identification number of the data message.

In the step 606, when there is a corresponding data message chain, the system adds the data message to the back of the corresponding data message chain to obtain a revised data message chain. In the step 607, when there is no corresponding data message chain, the system adds a new data message chain and adds the data message to the new data message chain to obtain a revised data message chain.

The method continues with the step 608 in which rule-operate topics of all data messages of the revised data message chain to obtain a dynamic priority of the data message. In the next step 610, the system replaces the original priority of the data message with the dynamic priority to obtain a revised data message. Then, in the step 612, the revised data message is published according to the dynamic priority.

Although the present invention has been described in considerable detail with reference to certain embodiments thereof, other embodiments are possible. For example, each data message chain in the data message chain table has a data message chain identification number, and data messages have their own corresponding data message chain identification number. The corresponding message chain of a data message means that the data message chain identification number of the data message chain is the same as the corresponding data message chain identification number of the data message. Therefore, their spirit and scope of the appended claims should no be limited to the description of the embodiments herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

Several different advantages exist with these and other embodiments. The method and system can set proper priority of the data message according to the corresponding message chain. Therefore, the data message can be published at proper time. The data message is still stored in the data message chain after the data message is published, which affect the priorities of the following related messages. Hence, the following process of data message can be traced. In addition, as the increasing number of the data messages, the priorities of data messages can be factors to determine the sequence of data messages to deal with.

What is claimed is:

1. A computer-implemented priority-based data message publishing method according to a data message chain, comprising the steps of:

receiving a data message, wherein the data message has an original priority;

judging whether there is a corresponding data message chain corresponding to the data message;

when there is a corresponding data message chain, adding the data message to the back of the corresponding data message chain to obtain a revised data message chain;

when there is no corresponding data message chain for the data message, adding a new data message chain, and adding the data message to the back of the new data message chain to obtain a revised data message chain;

after the data message is added to obtain the revised data message chain, rule-operating all data messages of the revised data message chain to obtain a dynamic priority of the data message, wherein the rule-operations compare all topics of data messages of the revised data message chain with a rule database to determine the situation of the data message, and obtain the dynamic priority of the data message according to the situation of the data message;

replacing the original priority with the dynamic priority to obtain a revised data message; and publishing the revised data message according to the dynamic priority.

2. The method of claim 1, wherein a corresponding data message chain corresponding to the data message means that a data message identification number of the last data message of the corresponding data message chain is the same as a corresponding data message identification number of the data message.

3. The method of claim 2, wherein each data message of the data message chain is added to the back of the corresponding data message chain in time sequence, and a data message identification number of each data message of the corresponding data message chain is the same as a corresponding data message identification number of next data message of the corresponding data message chain.

4. The method of claim 3, wherein each data message of the corresponding data message chain has a data message topic.

5. The method of claim 4, wherein rule-operating the revised data message chain to obtain a dynamic priority of the data message comprises the steps of:

reading-in data message topics of all data messages of the revised data message chain; and rule-operating the data message topics to obtain a dynamic priority of the data message.

6. The method of claim 1, wherein a corresponding data message chain corresponding to the data message means that a data message chain identification number of the corresponding data message chain is the same as a corresponding data message chain identification number of the data message.

7. The method of claim 6, wherein each data message of the data message chain is added to the back of the corresponding data message chain in time sequence, and the corresponding data message chain identification number of each data message of the corresponding data message chain is the same as a data message chain identification number of the corresponding data message chain.

8. The method of claim 7, wherein each data message of the corresponding data message chain has a data message topic.

9. The method of claim 8, wherein rule-operating the revised data message chain to obtain a dynamic priority of the data message comprises the steps of:

reading-in data message topics of all data messages of the revised data message chain; and rule-operating the data message topics to obtain a dynamic priority of the data message.

10. A priority-based data message publishing system according to a data message chain, comprising:

a publishing computer, running a publishing application, wherein the publishing application publishes a data message, wherein the data message comprises an original priority;

a data message broker building a connection with the publishing application to execute the following steps:

receiving the data message;

searching for a corresponding data message chain corresponding to the data message;

adding the data message to the back of the corresponding data message chain to obtain a revised data message chain;

after the data message is added to obtain the revised data message chain, rule-operating all data messages of the revised data message chain to obtain a dynamic priority of the data message, wherein the rule-operations compare all topics of data messages of the revised data message chain with a rule database to determine the situation of the data message, and obtain the dynamic priority of the data message according to the situation of the data message;

replacing the original priority with the dynamic priority to obtain a revised data message; and publishing the revised data message according to the dynamic priority; and a subscribing computer, running a subscribing application, wherein the subscribing application builds a connection with the data message broker to receive the revised data message.

11. The system of claim 10, wherein the data message broker comprises:

a data message chain table to receive the data message, search for a corresponding data message chain corresponding to the data message, and adding the data message to the back of the corresponding data message chain to obtain a revised data message chain;

a rule engine having a connection with the data message chain table to rule-operate the revised data message chain to obtain a dynamic priority of the data message; and a dynamic prioritizer receiving the data message, having a connection with the rule engine, replacing the original priority with the dynamic priority to obtain the revised data message, and publishing the revised data message according to the dynamic priority.

12. The system of claim 11, wherein the data message chain table stores a plurality of data message chains.

13. The system of claim 12, wherein data messages of the data message chains are added to the back of the data message chain sequentially, and a data message identification number of each data message of the data message chains is the same as a corresponding data message identification number of the next data message of the data message chains.

14. The system of claim 12, wherein data messages of the data message chains are added to the back of the data message chains sequentially, and a corresponding data message chain identification number of each data message of the data message chains is the same as a data message chain identification number of the data message chain.

15. The system of claim 11, wherein each data message of the data message chains has a data message topic.

16. The system of claim 15, wherein the rule engine reads in all the data message topic of the data messages of the revised data message chain to do rule-operation to obtain the dynamic priority.

17. A non-transitory computer readable storage medium to store several instructions to execute a data message publishing method, wherein the data message publishing method comprises the steps of:

receiving a data message, wherein the data message has an original priority;

judging whether there is a corresponding data message chain corresponding to the data message;

when there is a corresponding data message chain, adding the data message to the back of the corresponding data message chain to obtain a revised data message chain;

when there is no corresponding data message chain, adding a new data message chain, and adding the data message to the back of the new data message chain to obtain a revised data message chain;

after the data message is added to obtain the revised data message chain, rule-operating all data messages of the revised data message chain to obtain a dynamic priority of the data message, wherein the rule-operations compare all topics of data messages of the revised data message chain with a rule database to determine the situation of the data message, and obtain the dynamic priority of the data message according to the situation of the data message;

replacing the original priority with the dynamic priority to obtain a revised data message; and publishing the revised data message according to the dynamic priority.

18. The storage medium of claim 17, wherein a corresponding data message chain corresponding to the data message means that a data message identification number of the last data message of the corresponding data message chain is the same as a corresponding data message identification number of the data message.

19. The storage medium of claim 18, wherein each data message of the data message chain is added to the back of the corresponding data message chain in time sequence, and a data message identification number of each data message of the corresponding data message chain is the same as a corresponding data message identification number of next data message of the corresponding data message chain.

20. The storage medium of claim 19, wherein each data message of the corresponding data message chain has a data message topic.

21. The storage medium of claim 20, wherein rule-operating the revised data message chain to obtain a dynamic priority of the data message comprises the steps of:

reading-in data message topics of all data messages of the revised data message chain; and rule-operating the data message topics to obtain a dynamic priority of the data message.

22. The storage medium of claim 17, wherein a corresponding data message chain corresponding to the data message means that a data message chain identification number of the corresponding data message chain is the same as a corresponding data message chain identification number of the data message.

23. The storage medium of claim 22, wherein each data message of the data message chain is added to the back of the corresponding data message chain in time sequence, a corresponding data message chain identification number of each data message of the corresponding data message chain is the same as a data message chain identification number of the corresponding data message chain.

24. The storage medium of claim 23, wherein each data message of the data message chain has a data message topic.

25. The storage medium of claim 24, wherein rule-operating the revised data message chain to obtain a dynamic priority of the data message comprises the steps of:

reading-in data message topics of all data messages of the revised data message chain; and rule-operating the data message topics to obtain a dynamic priority of the data message.

* * * * *